United States Patent [19]

Kuckens

[11] 4,393,982

[45] Jul. 19, 1983

[54] METERED DISPENSING OF LIQUIDS

[75] Inventor: Alexander Kuckens, Hamburg, Fed. Rep. of Germany

[73] Assignee: Dagma Deutsche Automaten und Getrankemaschinen GmbH & Co. KG, Fed. Rep. of Germany

[21] Appl. No.: 103,904

[22] Filed: Dec. 17, 1979

[51] Int. Cl.³ ............................................. B65D 83/00
[52] U.S. Cl. .................................. 222/209; 222/214; 222/530
[58] Field of Search ............... 222/207, 529, 530, 214, 222/209, 504, 212

[56] References Cited

U.S. PATENT DOCUMENTS

| | | | |
|---|---|---|---|
| 2,299,572 | 10/1942 | Estenes | 222/207 X |
| 2,554,570 | 5/1951 | Harvey | 222/214 X |
| 2,772,817 | 12/1956 | Jauch | 222/207 |
| 2,824,672 | 2/1958 | Wersching | 222/207 |
| 3,162,335 | 12/1964 | Kogan et al. | 222/212 |
| 3,390,860 | 7/1968 | Kavanau | 222/529 X |
| 4,030,640 | 6/1977 | Citrin | 222/214 X |

FOREIGN PATENT DOCUMENTS 827778 2/1960 United Kingdom ............... 222/214

Primary Examiner—Allen N. Knowles
Attorney, Agent, or Firm—Barnes, Kisselle, Raisch, Choate, Whittemore & Hulbert

[57] ABSTRACT

A container from which liquid is dispensed has a metering chamber arranged at its mouth. A metering device is arranged to cooperate with the outside of this metering chamber to control the amount of liquid allowed to flow out. The flow can be controlled either by determining the time for which the metering device opens the metering chamber, or by constructing the metering chamber as a pump chamber of a specified volume so that the metering device pumps the liquid out of the chamber and therefore dispenses a predetermined volume. In the second method, the metering chamber includes an axially compressible bellows portion which forms a pump chamber. Non-return valves are provided at both ends of the pump chamber, and the metering device comprises plates on either side of the bellows section which can be drawn towards one another to squeeze the bellows section.

6 Claims, 5 Drawing Figures

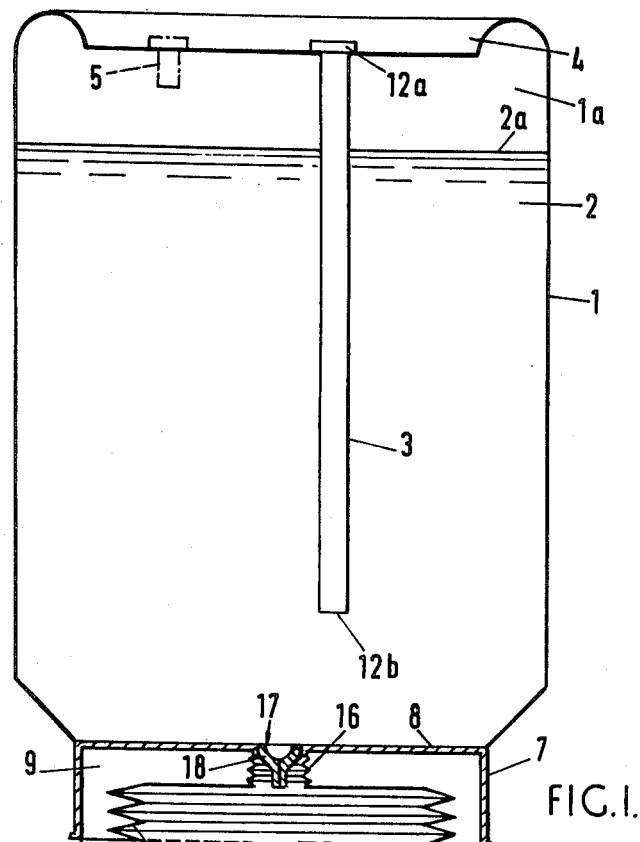
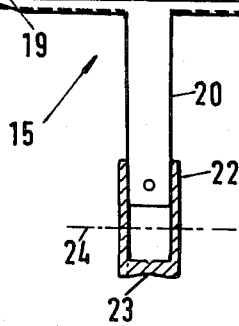
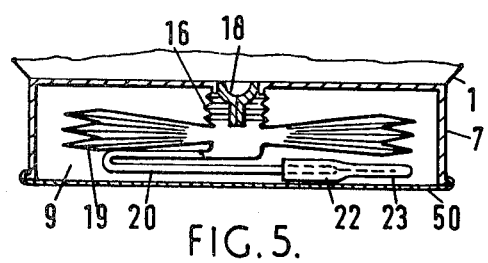
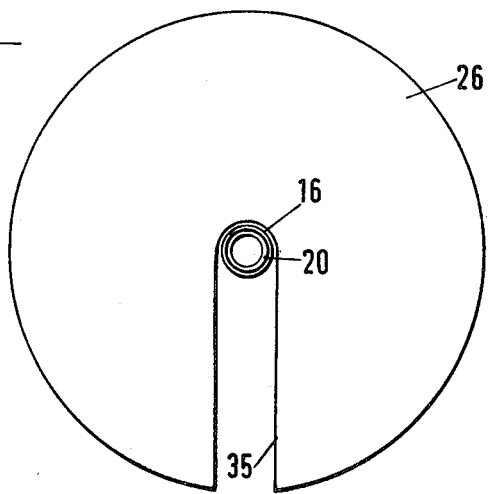

METERED DISPENSING OF LIQUIDS

BACKGROUND OF THE INVENTION

1. Field of the Invention

The invention relates to the metered dispensing of liquids, and in particular to a dispensing system comprising a container and a metering device, and to a container for use in such a system.

2. Description of the Prior Art

The apparatus serves in particular for metered dispensing of easily perishable organic liquids. For these, disposable packages are preferably used in order to avoid bacteriological or like soiling problems due to insufficient cleaning of the transport or storage containers. Such metering devices are known in which it is merely necessary to connect the metering device sealingly to the disposable package. The delivery is effected under time or volume control. Once the package is empty, it is discarded and a new, full package is connected to the metering device.

Now although the disposable package helps to avoid soiling problems or infections or the like because it is discarded after use, the metering device is used time and again, and becomes soiled and difficult to clean so that the advantages aimed at become only partly effective in practice.

SUMMARY OF THE INVENTION

According to the invention, there is provided a system for metered dispensing of liquids, comprising a container and a metering device, the container comprising a neck portion, a metering chamber connected to the neck portion for receiving liquid from the container.

The invention relates to the metered dispensing of liquids, and in particular to a dispensing system comprising a container and a metering device, and to a container for use in such a system.

The apparatus serves in particular for metered dispensing of easily perishable organic liquids. For these, disposable packages are preferably used in order to avoid bacteriological or like soiling problems due to insufficient cleaning of the transport or storage containers. Such metering devices are known in which it is merely necessary to connect the metering device sealingly to the disposable package. The delivery is effected under time or volume control. Once the package is empty, it is discarded and a new, full package is connected to the metering device.

Now although the disposable package helps to avoid soiling problems or infections or the like because it is discarded after use, the metering device is used time and again, and becomes soiled and difficult to clean so that the advantages aimed at become only partly effective in practice.

According to the invention, there is provided a system for metered dispensing of liquids, comprising a container and a metering device, the container comprising a neck portion, a metering chamber connected to the neck portion for receiving liquid from the container and a delivery opening from the chamber for discharge of metered quantities of liquid, the metering device being adapted to cooperate with the external wall of the metering chamber to close the delivery opening when said metered quantity has been discharged.

With this system, the metering device does not come into contact with the liquid at any time. In this way soiling of the metering device by the liquid is impossible. On the other hand, soiling of the metering device cannot produce any effect on the liquid since the latter passes through the metering device in a contact-less manner.

Advantageously a vent tube is permanently built into the disposable container. During storage of the container, the inlet opening of the vent tube, in the bottom of the container may be hermetically sealed by a releasable closure, e.g. a tear-off closure. In operation, the vent tube introduces air into the container close to the neck thereof, so that the boundary surface between the air and the liquid lies close to the removal opening. This is necessary for time-controlled metering independent of the liquid level in the container.

In some cases it may be sufficient to introduce air merely into the head space of the disposable container. Preferably the container is provided near the neck portion with a storage recess in which prior to use of the container, the metering chamber is located in a folded state, so that it is protected during transport or during storage of the container and sealed by a container closure closing the recess. The metering chamber preferably includes a tubular member consisting of a flexible, preferably elastic material, and of sufficient length for it to be drawn through the metering device when the container closure has been opened. In one embodiment, the tubular member may be placed in a spirally folded manner in the storage recess, so that it can easily be pulled out after the closure has been opened. The free end of the tubular member may be in the form of an outlet nozzle with reduced cross-section. The metering chamber may consist of a natural rubber or another material which is inert with respect to the liquid. The storage recess may be hermetically sealed to the outside by a screw or a tear-off container closure.

The metering chamber is preferably in the form of a corrugated bellows section.

The metering device may comprise a sleeve-like or ring-like or piston like armature through which the tubular member, attached to the bellows section, is drawn for the purpose of putting the container in the operative position. The ring-like armature can be moved in the direction of the axis of the tubular member from a lowered position to a raised position by means of an actuating device. Advantageously the ring-like armature co-operates with an electro-magnetic actuating device.

In the lowered position the ring-like armature may actuate a clamping device which is arranged at a level slightly above the outlet nozzle of the tubular member and which can clamp the tube closed. The actuation of the clamping device occurs preferably by the weight of the ring-like armature so that in the case of an electromagnetic actuating device the tube is automatically closed upon failure of the current.

When the ring-like armature is moved to the raised position by its actuating device, the clamping device is released and the tube opens to release a flow of liquid. The opening of the jaw-like clamping device may be effected for example under the static pressure of the liquid. Alternatively, however, the jaws may be associated with resilient return elements.

When, in the manner previously described, the static pressure of the liquid in the tubular member is always maintained constant, accurate metering of the liquid from the container can be obtained directly by time control of the actuating device for the ring-like armature. The metered liquid may be introduced directly into a vessel placed in readiness, or into a mixing device, without the liquid coming into contact with the metering device. It is not therefore necessary to clean the metering device or to subject it to continuous hygienic supervision.

The embodiment described may be employed with advantage where substantial changes of the viscosity of the liquid are unlikely to occur. Such conditions arise, for example, in cases in which perishable liquids are maintained continuously at the same temperature by cooling the containers, so that the temperature of the contents remains within narrow limits and cannot have a significant effect on the viscosity of the liquid or on the accuracy of the metering.

In a preferred embodiment, a plate is arranged on either side of the bellows section, and these plates are drawn together, for example by a magnetic force, to squeeze the bellows section and expel liquid contained in the bellows section out of the delivery opening. This embodiment does not therefore make use of timed operation of the metering device; instead, the volume dispensed is determined by the internal volume of the bellows section, and the movement of the plates toward one another. One of the plates is preferably provided with an electromagnetic coil, and the other plate is made of a magnetic material so that on actuation of the coil the two plates are moved together. Either one of the plates may be fixed, so that the other plate is drawn towards the fixed plate. Stops may be provided to limit the travel of one plate towards the other so as to control the quantity of liquid dispensed. The volume of liquid dispensed is therefore independent of the viscosity, and this embodiment can therefore be used for liquids which do not require cooling, e.g. self-preserving syrups or concentrates, i.e. liquids with a very high sugar or salt content. The viscosity of such liquids is influenced to a considerable extent by temperature fluctuations, but such fluctuations will not cause inaccuracies in the volume dispensed if this embodiment is used.

Valves are preferably provided between the metering chamber and the container and between the metering chamber and the external atmosphere. These valves should be non-return valves arranged so that the valve between the container and the metering chamber opens automatically to admit liquid to the metering chamber when the pressure in the chamber drops below that in the container. When the pressure in the chamber is higher than that in the container, the valve closes. The valve between the chamber and the external atmosphere opens when the pressure in the chamber rises above the external pressure, to dispense liquid, and closes when the pressure in the chamber drops below the external pressure. A pumping effect is therefore achieved as the bellows is compressed and allowed to expand. Once the electromagnetic coil has been switched off, it is necessary that the bellows should once again expand. To this end, the bellows may be of material which is sufficiently resilient to provide the restoring force expanding the bellows. Alternatively, an auxiliary spreader spring may be provided to supply the restoring force. In a preferable embodiment, the electromagnetic coil is positioned underneath the bellows and moves towards an upper, stationary plate. When the current is switched off, the coil drops under the influence of gravity and draws with it the lower side of the bellows, to open the bellows.

In this embodiment where delivery is controlled by a volume, perfect hydienic operation is again ensured because the liquid does not come into contact with the metering device at any time. This embodiment has the advantage that temperature effects which influence the viscocity of the liquid do not affect the volume dispensed.

Since the containers for use with the metering device will be made and sold separately from the metering device, the present invention also provides a container from which liquids can be dispensed in metered quantities by means of a metering device, the container comprising a neck portion, a metering chamber connected to the neck portion for receiving liquid from the container and a delivery opening from the chamber for discharge of metered quantities of liquid.

The metering chamber preferably includes an axially compressible bellows section.

BRIEF DESCRIPTION OF THE DRAWINGS

The invention will now be further described, by way of example, with reference to the accompanying drawings, in which:

FIG. 1 is an axial sectional view through a container according to the invention;

FIG. 3 is a plan view of part of the metering device of FIG. 2;

FIG. 5 is a detail view of part of the container of FIG. 1, in the storage condition.

DESCRIPTION OF THE PREFERRED EMBODIMENT

Figure 2:
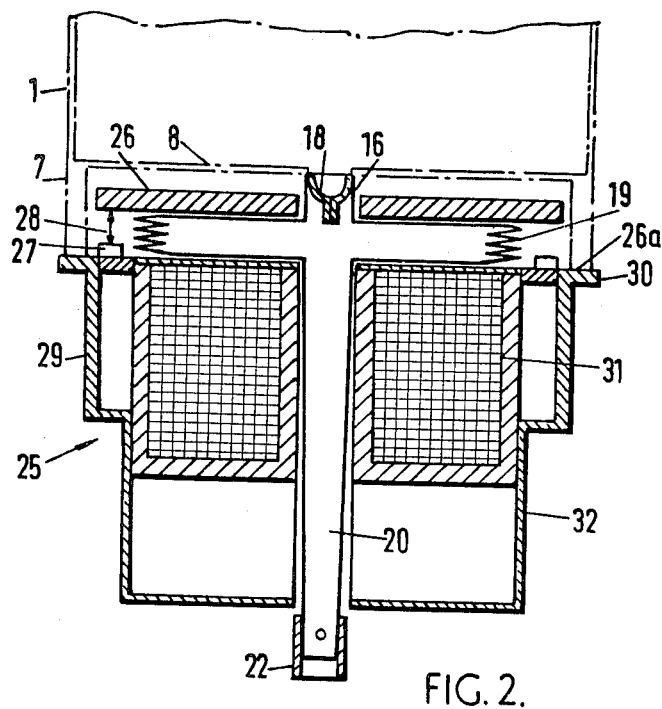
FIG. 2 is an axial sectional view through a metering device.

The container illustrated in FIG. 1 is a disposable or one-time package for containing liquids to be dispensed in metered quantities. The container is shown in a position immediately prior to use, and may consist of, for example, a synthetic resin. In the illustrated example, it comprises a body having a dished bottom 4 which points upwardly in the dispensing position illustrated in FIG. 1. In the illustrated position, the top of the body terminates in a slightly narrowed neck section 7 which extends like a collar from an intermediate wall 8 and bounds an accumulation chamber 9 the purpose of which will be described below in detail. The collar-like neck section 7 terminates at the top in an end face 10.

The container shown in FIG. 1 is filled with a liquid 2 to be dispensed. The liquid level in the illustrated position is denoted by 2a. A head space 1a exists above the liquid level. The interior of the container must be vented if the liquid is to flow out. For this purpose a vent tube 3 may be fixed in the bottom 4, and sealed outwardly at 12a by a tear closure. The tube extends over most of the height of the container to a position close to the container neck 7. When liquid is being dispensed, the lower end 12b of the tube determines the boundary surface between the liquid and the outer atmosphere and thus the pressure acting on the liquid above the intermediate wall 8 of the container neck. This kind of venting offers certain known advantages. In some cases these advantages are not important, and a short tube 5 (indicated by a broken line) may be fixed in the bottom 4 instead of the tube 3. In use, the short tube 5 terminates in the head space 1a.

The intermediate wall 8 has an opening 17 which may be disposed centrally or eccentrically. An additional container member 15 is sealed to the edge of the opening.

The additional container member 15 may be a simple flexible tube which is in free communication with the interior of the container 1 and comprises at its lower end a tear-open closure. Such an embodiment is not illustrated. When the container is stored, the tube is spirally wound up in the accumulation chamber 9 of the container neck, and the accumulation chamber is closed outwardly by a tear-open closure. To put the container into use, the accumulation chamber closure is opened and the tube is pulled out and threaded through an electro-magnetic actuating device to such an extent that the closed lower end of the tube projects beyond the underside of the device. In this case the end of the tube is threaded through two clamping jaws or another clamping device actuable by the electro-magnetic device which shuts off the lower end of the tube, by clamping, when the magnetic device is switched off. The tear-off closure at the lower end of the tube may then be removed to open the lower end of the tube without liquid flowing out. The clamping device may be opened by actuation of the electro-magnetic device, so that the liquid is directly delivered from the tube without coming into contact with the actuating device or the clamping device. The duration of the actuation of the electro-magnetic device determines in this case the quantity of liquid flowing out.

In the illustrated preferred embodiment, an electro-magnetic actuating device is used, in addition to a closure device for the tube, for the production of a pumping effect.

For this purpose, the additional container member 15 according to FIG. 1 comprises a resilient, axially compressible portion 19 which can be compressed to alter its volume. This compressible portion 19 is hermetically sealed to the edge of the opening in the intermediate wall 8 by means of an extensible connecting section 16, and terminates in a narrow tube portion 20 which can be threaded through a metering device 25, which will be described with reference to FIG. 2 and FIG. 4.

An automatic closing device is arranged in the inlet opening 17 of the connecting section 16 of the container member 15. In the illustrated example this is a non-return valve which is constructed like a duck's beak and is held in the closed position by elastic deformation forces; when pressure differences occur on the two sides of the valve, it either opens or closes, depending upon the direction of the pressure drop.

The resilient, axially compressible section 19 is preferably constructed in the form of a cylindrical corrugated bellows section which has a diameter nearly as large as that of the accumulation chamber 9. The free end of the tubular section 20 is connected to a further closure device 22 of any desired kind. Preferably this is also constructed as a beak-shaped non-return valve, like the valve 18. Before the container is put into use, the beak-like section is extended and its free end is welded closed or permanently closed in some other way, e.g. by a cover section 23. To put the container into use, the section 23 may be torn off along a weakened line or cut off by means of a tool, so that the non-return valve section 22 is able to function.

The electro-magnetic metering device 25 shown in FIG. 2 comprises a housing 30, 32 which can be connected by means of devices not illustrated, e.g. a quick-action connector, to the correspondingly constructed collar 7 of the container 1. A hermetic connection between the two is not necessary. Prior to the attachment of the housing 30, 32, the connector section 16 of the additional container member 15 is elastically extended or pulled to the side, so that a plate-shaped armature disc 26 (FIG. 3), which has a radial slot 35, can be pushed over the connector section 16 and arranged above the corrugated bellows section 19 within the collar 7 of the container neck. The underside of the corrugated bellows 19 rests upon a countersurface 26a of the housing 30, 32 located opposite the armature plate 26. An electro-magnetic coil 31 is arranged in the housing. The lower narrowed portion of the housing 32 may be used for an electro-optical monitoring device for monitoring the liquid level in the container. The housing 30, 32 and the coil 31 define a passage extending parallel to the container axis, for the tubular section 20 of the container member 15.

The corrugated bellows section 19 shown in FIG. 2 is constructed from a material with a wall thickness and a predetermined starting shape such that the resilience of the corrugated bellows 19 is sufficient to raise or maintain, respectively, the armature plate 26 against gravity in the starting position illustrated in FIG. 2, when the electro-magnetic coil 31 is switched off. When the latter is switched on, the armature disc 26 is pulled in the direction of the magnet coil 31 and the counter surface 26a; the length of the stroke 28 may be predetermined by spacer members 27. Since the connector section 16 is elastically longitudinally extensible, the corrugated bellows section 19 may be axially compressed by the armature plate 26 and the liquid located in the container member 15 may be pressed out of the tube section 20 causing the valve beak 22 to open. The quantity of liquid dispensed is determined exclusively by the volumetric change of the corrugated bellows section 19 and by the pressure differences causes thereby. In this case the upper valve 18 remains closed. After the coil 31 has been switched off, the armature plate 26 is raised again into the starting position under the effect of the resilience of the corrugated bellows 19. The valve 22 closes and the upper beak valve 18 opens because of the underpressure produced in the container member 15, so that liquid can flow from the container 1 into the container member 15. An additional spreader spring may be provided between the counter surface 26a and the armature plate 26 when the resetting force of the corrugated bellows 19 is insufficient.

In every case the wall material of the additional container member 15 is so constructed that the strength is sufficient to exclude any expansion of the wall of the container member when the container member is compressed so that an exactly predeterminable volume change is ensured by the axially compressible section. In order to avoid pressure changes upon the corrugated bellows due to different liquid levels in the container 1, the container 1 should be vented by means of a deeply immersed vent tube 3 according to FIG. 1. However, if the restoring force of the corrugated bellows due to the resilience of the bellows or the presence of a spreader spring is sufficiently large, venting is also possible by means of the tube 5 shown in FIG. 1, which only vents the head space 1a.

During packaging and during the transport and storage of the container 1, the corrugated bellows 19 is axially compressed and the tube section 20 is folded together on the underside of the compressed corrugated bellows, so that the unit is accommodated in the accumulation chamber 9 of the container neck, as shown in FIG. 5. The accumulation chamber is closed outwardly by a tear-off cover 50. The sealed section 23 which may be cut off or torn away ensures, independently of the container closure 50, easy connection of the container to an actuating device and hygienic packaging of the liquid prior to initial use of the device.

Figure 4:
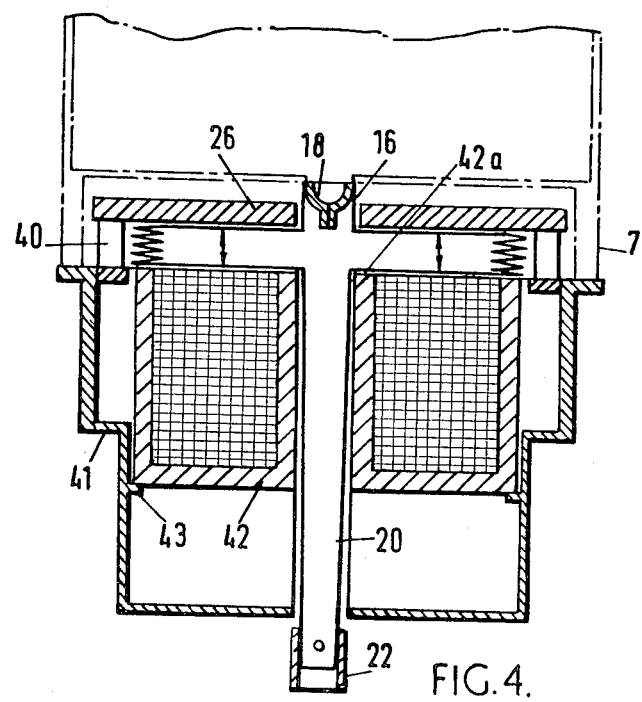
FIG. 4 is an axial sectional view of an alternative metering device.

In the embodiment shown in FIG. 4 spacer members 40 provide that the armature plate 26 is supported at a predetermined constant spacing from the end face of the housing 41. In contrast the coil is received in a coil housing 42 which is axially movable within the housing 41, as indicated by the double-headed arrows. The upper side of the coil housing forms the counter surface which co-operates with the stationary armature disc 26. In this case, the coil housing 42 is pulled against the armature plate 26 upon energisation of the coil, and in this way the corrugated bellows is compressed axially. The downward movement of the coil housing 42 is limited by fixed or movable abutments 43 in the housing 41. Preferably the coil housing is connected to the lower end of the corrugated bellows, so that the weight of the coil contributes to the extension of the corrugated bellows after de-energisation of the coil. In the case of a highly viscous liquid the FIG. 4 embodiment assists the liquid to flow quickly under the increased suction effect from the container 1 into the container member 15 when the coil is de-energised.

I claim:

1. A device for metered dispensing of liquids, especially easily perishable organic liquids, comprising a container in the form of a throw-away package with its outlet opening extending downward in metering position, a metering vessel portion of flexible material communicating with the outlet opening and comprising a tubular member, inlet and outlet openings, and an electromagnetic actuating means for selectively compressing the metering vessel and for actuating closing means at the inlet and outlet of the tubular member, wherein the container is provided with a collar surrounding the outlet opening, in which the metering vessel portion constantly connected to the container can be stored prior to putting the throw-away package into operation, wherein the tubular member of the metering vessel portion is provided with an axially compressible bellows between the closing means, said bellows having a large diameter as compared to its axial height, and wherein the area of the tubular member arranged therebelow extends through the central opening of the electromagnetic actuating means provided in the form of an annular coil, and the area arranged above the bellows penetrates an anchor plate radially extending above the bellows.

2. A device as claimed in claim 1, wherein the anchor plate has a radial slot for passage of the portion of the tubular memeber arranged above the bellows.

3. A device as claimed inclaim 1, wherein the annular coil with associated members can be attached to the collar, whilst the axially movable anchor plate by flexible bias means, especially the bellows as such, may be returned in upward direction.

4. A device as claimed in claim 1, wherein the anchor plate can in its axial position be secured to the collar and the annular coil is so constructed as to be liftable by compression of the bellows from an initial position determined by a stop toward the anchor plate.

5. A device as claimed in claim 1, wherein the transverse dimension of the bellows member corresponds at least to the outer diameter of the annular electromagnetic coil.

6. A disposable container from which liquids may be dispensed in metered quantities by means of a metering device, said container including a collar-like neck portion, a metering chamber including a section which is deformable connected to the container within the collar-like neck portion, a first valve positioned between the container and metering chamber for passing liquid into the metering chamber from the container, and a second valve connected to the metering chamber on the side thereof opposite the container for passing liquid out of the metering chamber, wherein the metering chamber and first and second valves are secured within the collar-like neck portion and a cover is positioned over the collar-like neck portion.

* * * * *